Aug. 18, 1959   J. F. E. ADAMS ET AL   2,899,754
DRYING PROCESS AND APPARATUS
Filed July 12, 1956
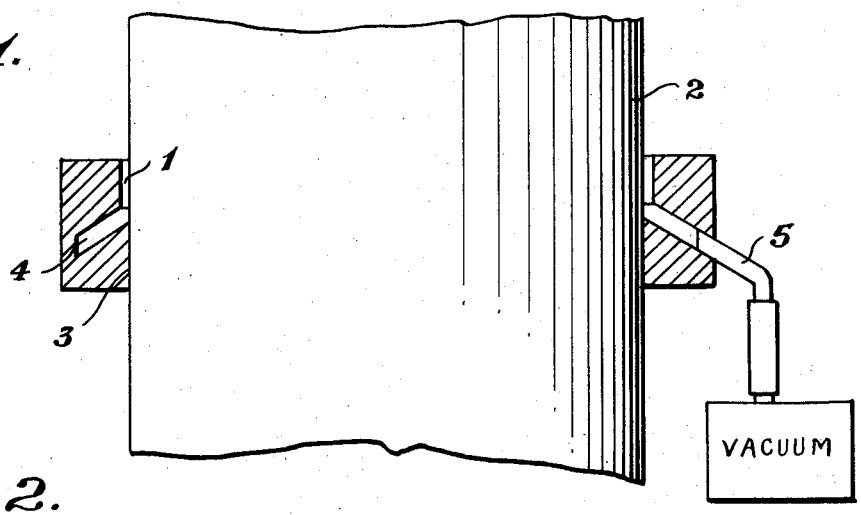
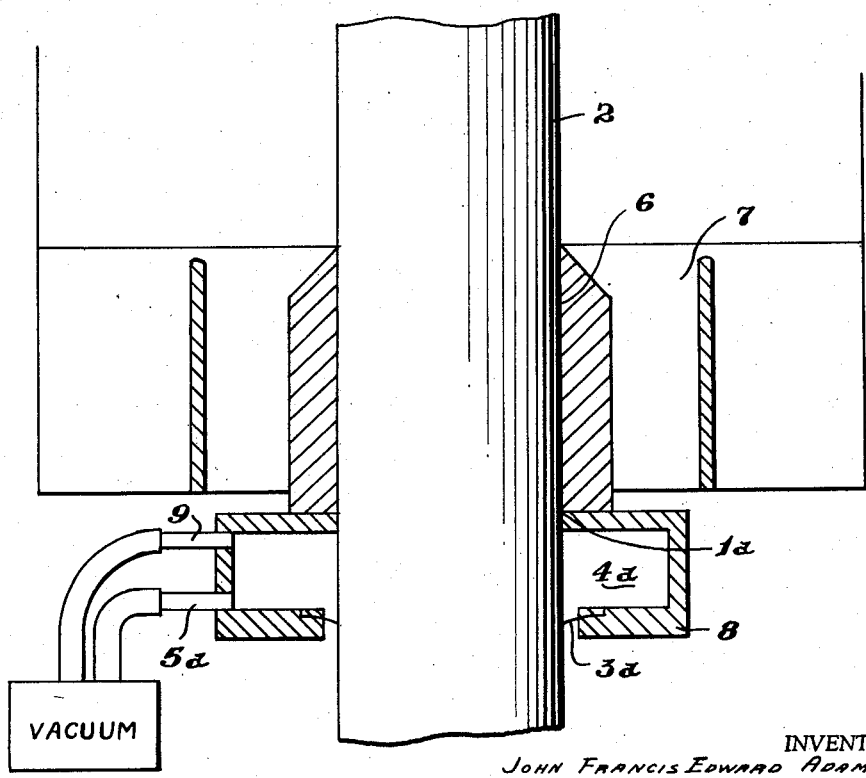
INVENTORS
JOHN FRANCIS EDWARD ADAMS
KENNETH GEORGE GERBER
GEORGE PATRICK WILKES
BY Cushman, Darby & Cushman
ATTORNEYS United States Patent Office 2,899,754
Patented Aug. 18, 1959

2,899,754
DRYING PROCESS AND APPARATUS

John Francis Edward Adams and Kenneth George Gerber, Welwyn Garden City, and George Patrick Wilkes, St. Albans, England, assignors to Imperial Chemical Industries Limited, London, England, a corporation of Great Britain Application July 12, 1956, Serial No. 597,393

Claims priority, application Great Britain July 13, 1955

3 Claims. (Cl. 34—21)

This invention relates to an improved process and apparatus for drying tubular film of organic thermoplastic material.

In processes for the production of tubular film by extruding an organic thermoplastic material in tubular form and stretching it by internal fluid pressure to reduce its thickness and, if required, to orient it, the tubular film is often subjected to treatment with liquids, for example to regulate the temperature of the film or to modify its surface characteristics. It is thus often necessary to dry the film during continuous production processes, and in some cases even to remove running water from the surface of the film.

It is an object of the present invention to provide a process and apparatus by which tubular film may be quickly and easily dried. By the term "drying" as used throughout this specification we mean removing water or any other liquid from the surface of the film.

In accordance with the present invention, a process for drying a continuously advancing length of tubular film of an organic thermoplastic material comprises passing the fully inflated film through a first passageway that is substantially circular and has a circumference not less than that of the inflated film, and through a second passageway that is substantially circular and has a circumference substantially equal to the circumference of the film, said first and second passageways being separated by an air space which completely surrounds the tubular film and to which a reduced pressure is applied through one or more outlets, the walls of said air space and at least one outlet from said space being so arranged as to allow liquid to be drained through said outlet from contact with the surface of the film passing through said air space.

According to a further feature of our invention, a device for drying a continuously advancing length of tubular film includes a first passageway of substantially circular cross section, a second passageway in alignment with said first passageway and having a substantially circular cross section of circumference equal to or smaller than that of said first passageway, an air space separating said first and second passageways and having at least one outlet apart from said passageways, and suction means communicating with at least one outlet, said passageways, said passageways being adapted to allow the continuous advancement therethrough of a fully inflated length of tubular film of circumference substantially equal to that of said second passageway, said air space being adapted to form an unbroken annular space around said tubular film, and the walls and one outlet of said air space being so arranged as to allow liquid to be drained through said outlet from contact with the surface of inflated tubular film passing through said air space.

The term "passageway" as used throughout this specification and in the claims is intended to include not only a passageway having walls of appreciable length but also a simple aperture, through a sheet member for example.

The process and apparatus of the invention may be used to dry a length of tubular film advancing in any direction; they have been found to be particularly useful for drying film advancing in a downward direction, especially vertically downwards.

Particular forms of apparatus constructed in accordance with the present invention are shown diagrammatically in the accompanying drawings, of which Figure 1 represents a simple form of apparatus and Figure 2 represents an apparatus in which a drying device of the present invention is used in conjunction with a cooling apparatus of the type described in United Kingdom specification No. 741,963.

In Figure 1: 1 represents the wall of the first passageway, which has a diameter slightly greater than that of the inflated tubular film 2 to be dried; 3 represents the wall of the second passageway, whose diameter is substantially equal to that of the inflated tubular film; and 4 represents a circular channel forming an annular space around the film between the two passageways, the floor of the channel sloping downwardly away from the film to drain away the water removed from the film, and the channel being provided with three equally spaced suction tubes 5, through which air and liquid are removed from the channel.

In operation of the illustrated process, air and liquid are drawn from the air space by the suction means, and the resulting reduced pressure in the air space causes air and liquid to be drawn in between the tubular film and the wall of the first passageway, and at the same time causes the fully inflated film to seal completely the entrance to the second passageway, so preventing the passage of air or water through the second passageway with the film.

In Figure 2: 6 represents the wall of the passageway of a cooling apparatus of the type described in said specification No. 741,963, this wall being bathed by a downwardly flowing stream of water, supplied from the tank 7, which cools the tubing 2 as it passes through the passageway. Attached to the bottom of the cooler is a drying device comprising a chamber 4a, having an upper wall that is attached to the cooler and is provided with an aperture 1a of the same diameter as the passageway of the cooler; this aperture, in conjunction with the passageway of the cooler, functions as the first passageway of the device of the present invention. The chamber 4a is provided with a floor 8 having an aperture that is of greater diameter than the aperture of the upper wall, but is provided with an annular rubber seal 3a. The internal diameter of this rubber seal when the seal is in the unflexed position is smaller than the diameter of the fully inflated tubing passing through the apparatus, but the seal is flexed downwards by the tubing and the aperture is slightly stretched until its effective diameter is equal to that of the inflated tubing. This aperture functions as the said second passageway of the device of the present invention. A suction tube outlet for water or water and air is provided at 5a, and an additional suction outlet for air at 9. An air inlet (not shown) is also provided.

In operation of the process, the water flowing down the walls of the cooler passes with the film into the chamber 4a, which is maintained at a pressure below the surrounding atmospheric pressure and from which the water is rapidly removed through the outlet 5a. The rubber seal 3a, partly because of its natural resilience and partly because of the reduced pressure above it, prevents the water from flowing through with the film, and the film emerges from the drying device in a substantially dry condition, free from surface droplets of water. The pressure in the chamber 4a may be regulated, by adjustment of the amounts of air admitted and removed, to a value that is sufficient to prevent leakage of water through the seal 3a but not sufficient to interrupt the smoothness of travel of the film through the apparatus.

It will be appreciated that many modifications may be made in the apparatus particularly described without departing from the scope of this invention. For example, in the apparatus of Figure 2 the seal 3a may be composed of a resilient substance other than rubber, or may be replaced by a rigid annular member; however, the resilient seal is preferred since it is particularly efficient in preventing leakage and can accommodate film of slightly different or varying diameters.

It is preferred to allow no substantial accumulation of liquid in contact with the film as it passes through the space between the two passageways, since this increases the difficulty of forming a seal at the entrance to the second passageway; moreover, the presence of excess liquid in the space may decrease the efficiency of the pump or pumps used to reduce the pressure therein, particularly when there is only one outlet channel for the air and liquid. There may then be a risk of the leakage of liquid between the film and the wall of the second passageway, and it is thus desirable to ensure that the efficiency of pumping and the amount of liquid to be removed are such as to prevent such accumulation of liquid. Some pumps of conventional type, for example injection pumps, will function efficiently only when the proportion of air to liquid passing through the pump is above a certain level. When a large amount of water is to be removed from the film, the presence of the necessary amount of air passing through such pumps can be insured by removing part of the water before the film reaches the first passageway of the drying device, for example by a scraper ring; or by supplying additional air as required into the air space through suitable ports; or by both these methods used together. If desired, the water may be removed through a suitable outlet by gravity alone, and a further air outlet, connected to a pump, may be provided to allow the pressure within the drying device to be suitably reduced.

When the circumference of the first passageway is equal to or only slightly greater than the circumference of the inflated film it is desirable to provide other air inlets into the air space, as described in connection with Figure 2, or there is a risk of air being drawn from between the wall of the second passageway and the film, and of water simultaneously leaking therethrough.

The amount by which the circumference of the first passageway preferably exceeds that of the second passageway and of the inflated tubular film depends largely upon the size of the film, the amount of water or other liquid to be removed, the rate at which air is removed from the annular space, and the speed of advancement of the film. The amount may be very small, for example as shown in Figure 2, where the difference allows only a thin curtain of water to flow between the film and the passageway.

The nature of the wall of the first passageway, if it is out of contact with the film, is not critical to the operation of the process of the invention. The wall of the second passageway, however, is preferably either a resilient diaphragm as previously described, or, if rigid, a smooth surface having a low coefficient of friction; this is particularly important for the entrance portion of the passageway adjoining the air space. The surface may be, for example, of polished metal, which may be coated with a lubricant, or of a plastic material having a low coefficient of friction, for example polytetrafluoroethylene or polythene.

We have found that by the processes of this invention moisture and even running water can be removed from the surface of tubular film with surprising efficiency and without afterwards supplying any heat to the film or to the apparatus. The film emerging from the second passageway is sufficiently dry to be directly wound or passed to another processing step.

The apparatus of the present invention may be used for drying films of any organic thermoplastic material that can be extruded and processed to give film in tubular form, and in whose production water or other liquid is used for quenching or for any other processing step. Organic thermoplastic materials that can be extruded and processed to give film in tubular form include, for example: linear film-forming superpolyesters, such as polyethylene terephthalate; linear superpolyamides; polymers and copolymers of certain vinyl compounds such as styrene and vinylidene chloride; and cellulose derivatives such as cellulose acetate. The process is especially useful in the production of film from materials that give a very mobile melt needing to be rapidly quenched, usually in water; such materials include the superpolyesters and superpolyamides, and the process has been found to be particularly useful for drying melt-extruded, quenched tubular film comprising polyethylene terephthalate.

We claim:

1. A process for removing surface liquid from a continuously advancing length of tubular film of an organic thermoplastic material comprising the steps of passing the fully inflated film successively through a first annular member having a diameter at least as large as that of the inflated film, a continuous annular space completely surrounding the inflated film, and a second annular member having a diameter substantially equal to that of the inflated film and in full contact therewith, and maintaining sub-atmospheric pressure in said annular space, whereby an effective seal is maintained between said second member and said inflated tube, and surface liquid is removed from said tube and said space.

2. A process according to claim 1, in which the length of tubular film is advanced in downward direction.

3. A process according to claim 1, in which the inflated film is resiliently engaged by said second member.

References Cited in the file of this patent

UNITED STATES PATENTS

| 2,096,882 | Chernosky | Oct. 26, 1937 |
| 2,194,565 | Moss | Mar. 26, 1940 |
| 2,196,449 | Witte | Apr. 9, 1940 |
| 2,492,440 | Reichel | Dec. 27, 1949 |
| 2,597,801 | Elliott | May 20, 1952 |
| 2,648,089 | Mayer | Aug. 11, 1953 |
| 2,773,312 | Peck | Dec. 11, 1956 |
| 2,804,694 | Clipsham | Sept. 3, 1957 |